United States Patent
Kapoor et al.

(10) Patent No.: US 7,529,864 B2
(45) Date of Patent: May 5, 2009

(54) METHOD AND SYSTEM FOR TESTING REMOTE I/O FUNCTIONALITY

(75) Inventors: Shakti Kapoor, Austin, TX (US); Deepak C. Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 10/984,307

(22) Filed: Nov. 9, 2004

(65) Prior Publication Data

US 2006/0123153 A1 Jun. 8, 2006

(51) Int. Cl.
G06F 13/28 (2006.01)
(52) U.S. Cl. .......................... 710/22; 714/719; 714/724
(58) Field of Classification Search .................... 710/22; 714/719, 724
See application file for complete search history.

(56) References Cited

U.S. PATENT DOCUMENTS

| | | | |
|---|---|---|---|
| 5,659,680 A * | 8/1997 | Cunningham et al. | 714/25 |
| 6,282,674 B1 * | 8/2001 | Patel et al. | 714/30 |
| 6,333,938 B1 | 12/2001 | Baker | |
| 6,341,308 B1 | 1/2002 | Yamaguchi et al. | |
| 6,671,733 B1 | 12/2003 | Errickson et al. | |
| 6,681,238 B1 | 1/2004 | Brice, Jr. et al. | |
| 2003/0115385 A1 * | 6/2003 | Adamane et al. | 710/22 |
| 2003/0144828 A1 * | 7/2003 | Lin | 703/21 |
| 2004/0030881 A1 | 2/2004 | Harrington et al. | |
| 2004/0064718 A1 | 4/2004 | Harrington et al. | |
| 2005/0132144 A1 * | 6/2005 | Illikkal et al. | 711/145 |
| 2005/0216611 A1 * | 9/2005 | Martinez | 710/22 |
| 2005/0228630 A1 * | 10/2005 | Tseng et al. | 703/19 |

* cited by examiner

Primary Examiner—Niketa I Patel
Assistant Examiner—Ernest Unelus
(74) Attorney, Agent, or Firm—Schmeiser, Olsen & Watts; William H. Steinberg

(57) ABSTRACT

A method and system for testing a remote I/O sub-assembly. The method including: allocating source memory, destination memory and DMA queue memory location in a memory of the remote I/O sub-assembly; writing a pattern of test data into the source memory location; writing a set of descriptors simulating data transfer commands into the DMA queue memory location; wrapping a first remote I/O port of the remote I/O sub-assembly to a second remote I/O port of the remote I/O sub-assembly with a remote I/O wrap cable; (e) configuring a DMA engine of the remote I/O sub-assembly to point to the DMA queue memory location and to the first and second remote I/O ports; and loading each descriptor of the set of descriptors into the DMA engine and transferring data from the source memory location to the destination memory location based on the descriptors.

24 Claims, 7 Drawing Sheets

METHOD AND SYSTEM FOR TESTING REMOTE I/O FUNCTIONALITY

FIELD OF THE INVENTION

The present invention relates to the field of micro-processor based servers; more specifically, it relates to method for testing remote I/O sub-assemblies of a micro-processor based servers.

BACKGROUND OF THE INVENTION

Servers are those portions of computer networks that interconnect remote computer systems to one another. Servers contain remote I/O sub-assemblies that control the two-way flow of data from the server to the remote computer systems. Currently, in order to test the operation of remote I/O sub-assemblies, the remote I/O sub-assemblies must be connected to a physical I/O sub-system and the server operating system loaded before testing. The physical I/O sub-system is the hardware/software that link network computers to the server. Constructing a physical I/O sub-system for each port of a remote I/O sub-assembly is expensive and time-consuming as is the actual plug in, test and unplug operations and adds to the cost or reduce the profitability of the manufacture of servers.

Therefore, there is a need for a less expensive and more efficient method and system for testing remote I/O sub-assemblies of a micro-processor based servers than is currently available.

SUMMARY OF THE INVENTION

The present invention wraps the remote I/O ports of an I/O hub of a remote I/O sub-assembly using cables and then stresses the remote I/O assembly by using the direct memory access engine of the I/O hub to transfer data in large volumes from a source memory location to a destination memory location in order to simulate network traffic from remote I/O ports to the memory of the remote I/O sub-assembly in order to test the remote I/O sub-assembly.

A first aspect of the present invention is a method of testing a remote I/O sub-assembly, comprising: (a) allocating a source memory location, a destination memory location and a direct memory access queue memory location in a memory of the remote I/O sub-assembly; (b) writing a pattern of test data into the source memory location; (c) writing a set of descriptors simulating data transfer commands into the direct memory access queue memory location; (d) wrapping a first remote I/O port of the remote I/O sub-assembly to a second remote I/O port of the remote I/O sub-assembly with a remote I/O wrap cable; (e) configuring a direct memory access engine of the remote I/O sub-assembly to point to the direct memory access queue memory location and to the first and second remote I/O ports; and (f) loading each descriptor of the set of descriptors into the direct memory access engine and transferring data from the source memory location to the destination memory location based on the descriptors.

A second aspect of the present invention is a method of testing a remote I/O sub-assembly, every remote I/O port of a same I/O port of the remote I/O sub-assembly directly connected to a single different remote I/O port of the remote I/O sub-assembly, comprising: (a) allocating a source memory location, a destination memory location and a direct memory access queue memory location in a memory of the remote I/O sub-assembly; (b) writing a pattern of test data into the source memory location; (c) writing a set of descriptors simulating data transfer commands into the direct memory access queue memory location; (d) configuring a direct memory access engine of the remote I/O sub-assembly to point to the direct memory access queue memory location and to the remote I/O ports of the remote I/O sub-assembly; and (e) loading each descriptor of the set of descriptors into the direct memory access engine and transferring data from the source memory location to the destination memory location based on the descriptors.

A third aspect of the present invention is a computer system comprising a processor, an address/data bus coupled to the processor, and a computer-readable memory unit coupled to the processor, the memory unit containing instructions that when executed by the processor implement a method for testing a remote I/O sub-assembly, a first remote I/O port of the remote I/O sub-assembly wrapped to a second remote I/O port of the remote I/O sub-assembly with a remote I/O wrap cable, the method comprising the computer implemented steps of: (a) allocating a source memory location, a destination memory location and a direct memory access queue memory location in a memory of the remote I/O sub-assembly; (b) writing a pattern of test data into the source memory location; (c) writing a set of descriptors simulating data transfer commands into the direct memory access queue memory location; (d) configuring a direct memory access engine of the remote I/O sub-assembly to point to the direct memory access queue memory location and to the first and second remote I/O ports of the remote I/O sub-assembly; and (e) loading each descriptor of the set of descriptors into the direct memory access engine and transferring data from the source memory location to the destination memory location based on the descriptors.

A fourth aspect of the present invention is a computer program product, comprising a computer usable medium having a computer readable program code embodied therein, the computer readable program code comprising an algorithm adapted to implement a method for a method for testing a remote I/O sub-assembly, a first remote I/O port of the remote I/O sub-assembly directly connected to a second remote I/O port of the remote I/O sub-assembly, the method comprising the steps of: (a) allocating a source memory location, a destination memory location and a direct memory access queue memory location in a memory of the remote I/O sub-assembly; (b) writing a pattern of test data into the source memory location; (c) writing a set of descriptors simulating data transfer commands into the direct memory access queue memory location; (d) configuring a direct memory access engine of the remote I/O sub-assembly to point to the direct memory access queue memory location and to the first and second remote I/O ports of the remote I/O sub-assembly; and (e) loading each descriptor of the set of descriptors into the direct memory access engine and transferring data from the source memory location to the destination memory location based on the descriptors.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Because the present invention for testing remote I/O sub-assemblies utilize structures and capabilities built into the remote I/O sub-assembly itself, it is necessary to describe an exemplary remote I/O sub-assembly first. For the purposes of the present invention, the term central electronic complex (CEC) should be understood to mean a remote I/O sub-assembly and the terms CEC and remote I/O sub-assembly may be used interchangable.

Figure 1:
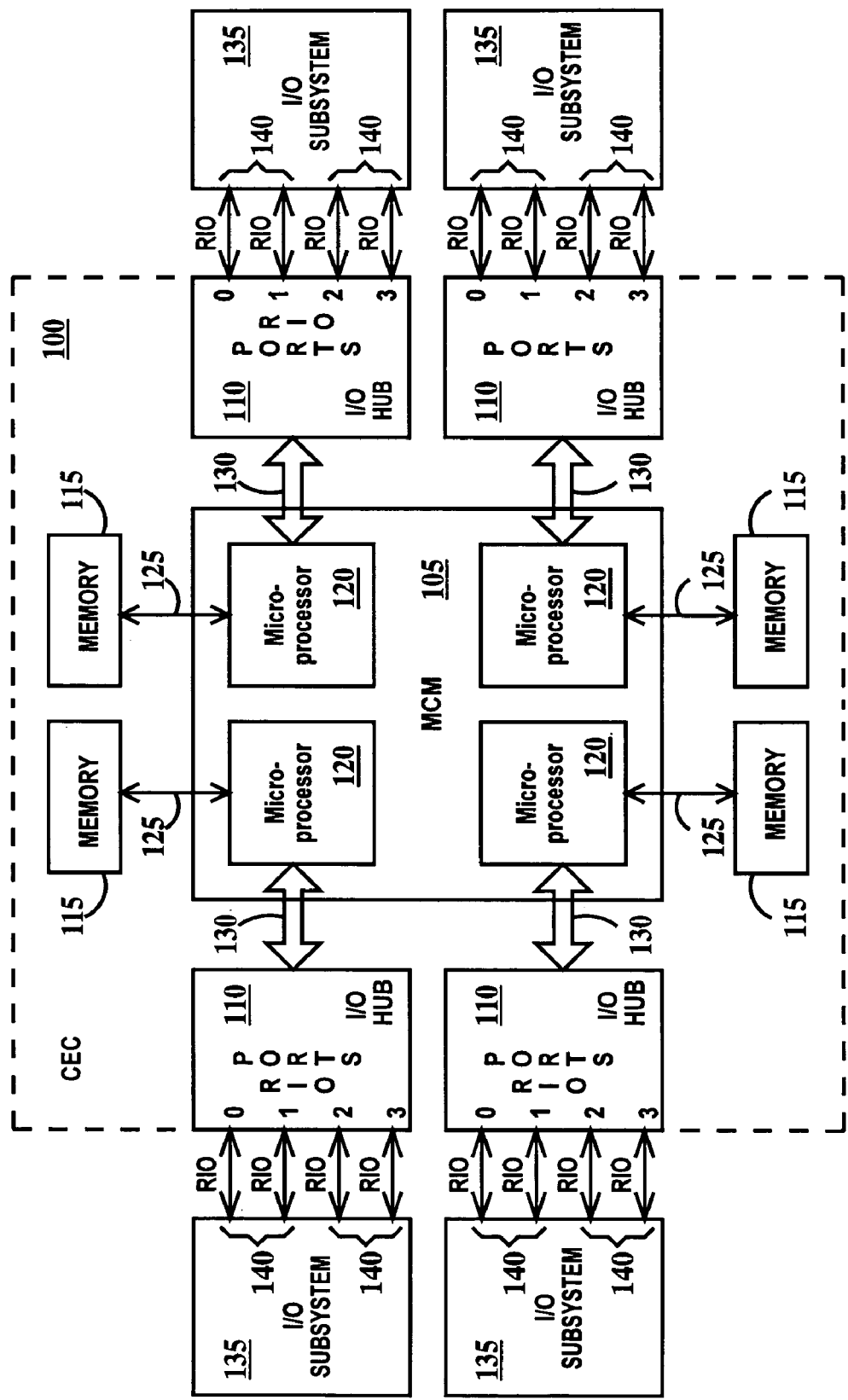
FIG. 1 is a schematic diagram of a remote I/O sub-assembly to be tested by the method of the present invention.

FIG. 1 is a schematic diagram of a remote I/O sub-assembly to be tested by the method of the present invention. In FIG. 1, an exemplary remote I/O sub-assembly or central electronic complex (CEC) 100 includes a multi-chip module (MCM) 105, I/O hubs 110 and memory devices 115. MCM 105 includes microprocessors 120. Microprocessors 120 are coupled to memory devices 115 by memory buses 125. Microprocessors 120 are each coupled to a single and different I/O hub 110 by a local microprocessor bus 130. In one example, CEC 100 is a printed circuit board and I/O hubs 110 and memory devices 115 are modules containing one or more integrated circuit chips. I/O hubs 110 are connected to I/O sub-systems 135 through remote I/O (RIO) cables 140. There are eight RIO cables 140 illustrated in FIG. 1, each connected to a RIO port 0 and a RIO port 1 or connected to a RIO port 2 and a RIO port 3. Physically, CEC 100 is provided with sockets (not shown) connected to RIO ports 0, 1, 2 and 3 and I/O subsystems 135 are provided with sockets (not shown) for plugging opposite ends of a RIO cables 140 into in order to connect RIO ports 0, 1, 2 and 3 to the I/O sub-systems 135. While four sets of I/O hubs 110, memory devices 115 and Microprocessors 120 are illustrated, any number of sets of I/O hubs 110, memory devices 115 and Microprocessors 120 may be provided. Also, while each I/O hub 110 is illustrated as having 4 RIO ports, the number of ports may be an y number that is a multiple of two. CEC 100 is an example of a 32 way system in that there are 4 local microprocessor buses 130 and 16 RIO ports (each providing two communication ways for a total of 32 ways. Additionally, there need not be a separate memory device for each microprocessor 120 and multiple Microprocessors 120 may share the same memory device 115 provided the memory device is partitioned. CEC 100 is itself pluggable into the chassis of a server. It is possible to have two or more MCMs 105 (with corresponding I/O hubs 110 and memory devices 115) on the same CEC 100.

Figure 2:
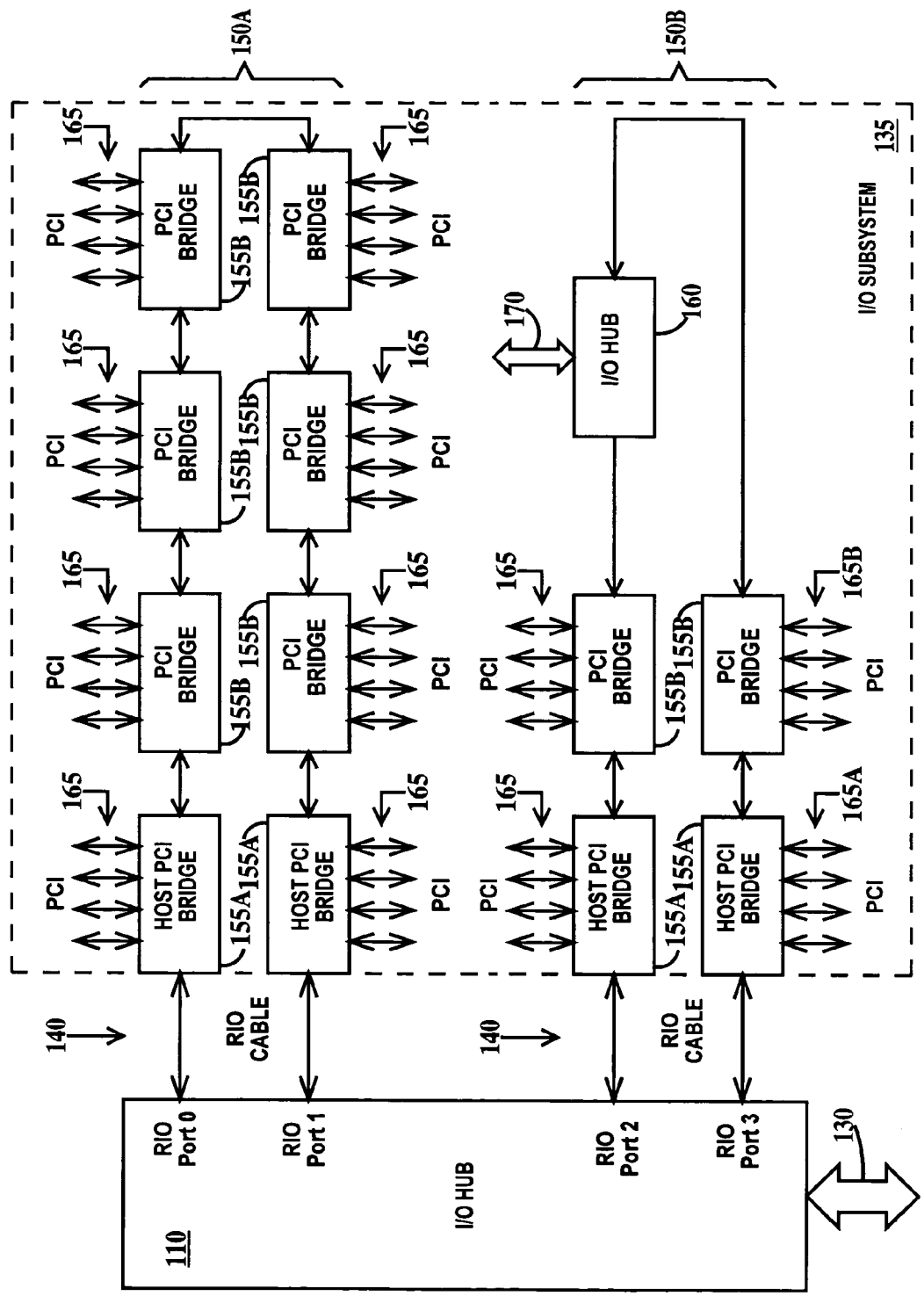
FIG. 2 is a schematic diagram of a portion of the remote I/O sub-assembly of FIG. 1, showing the connections to an exemplary I/O subsystem.

FIG. 2 is a schematic diagram of a portion of the remote I/O sub-assembly of FIG. 1, showing the connections to an exemplary I/O subsystem. In FIG. 2, I/O sub-system 135 includes a first set of network interconnect devices 150A and a second set of network interconnect devices 150B. First set of network interconnect devices 150A comprises two host peripheral component interconnect (PCI) bridges 155A and six PCI bridges 155B daisy-chained (sequentially connected in a loop) between a RIO cable 140 (port 0 and port 1). Second set of network interconnect devices 150B comprises a 2 host PCI bridges 155A, two PCI bridges 155B and an external I/O hub 160 daisy-chained between RIO cable 140 (port 2 and port 3). Each host PCI bridge 155A and PCI bridge 155B provides PCI ports 165 for connecting to network devices and external I/O hub 160 is provide with an external data/communication bus 170.

Currently, in order to test CEC 100, a physical I/O subsystem 135 for each I/O hub 135 must be built and connected to the CEC 100 being tested. The present invention will eliminate this need as described infra.

Figure 3:
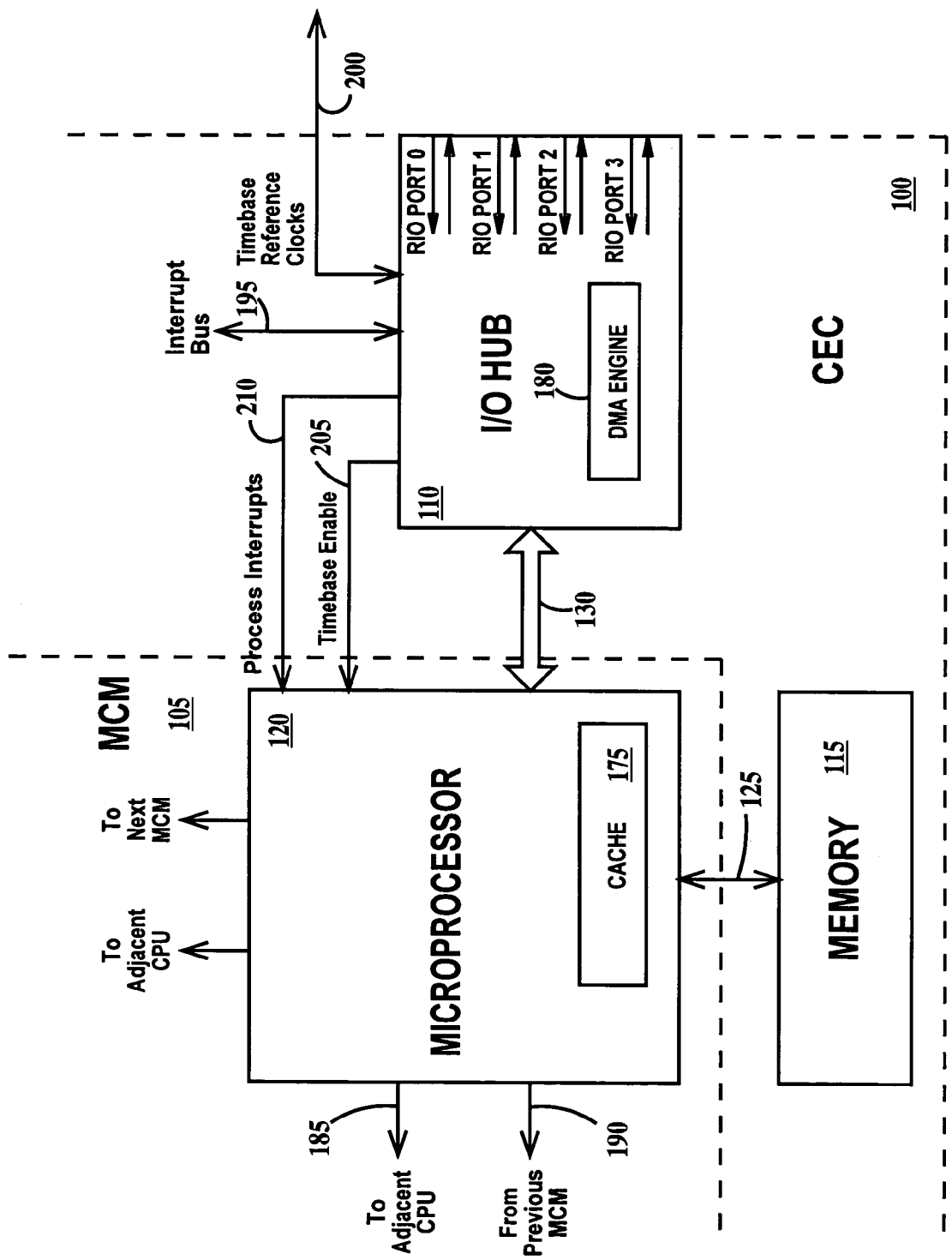
FIG. 3 is a schematic diagram of the interconnections between a microprocessor and an I/O hub of the remote I/O sub-assembly of FIG. 1.

FIG. 3 is a schematic diagram of the interconnections between a microprocessor and an I/O hub of the remote I/O sub-assembly of FIG. 1. In FIG. 3, microprocessor 120 includes a cache memory 175 and I/O hub 110 includes a direct memory access (DMA) engine 180. Microprocessor 120 is daisy-chained to adjacent CPUs (if present) by buses 185 and daisy-chained to additional MCMs 105 (if present) by buses 190. I/O Hub 110 is connected to an interrupt bus 195 and a timebase reference clock signal 200. I/O hub 110 can pass a timebase enable signal 205 and a process interrupt signal 210 to microprocessor 120. It should be noted that RIO ports 0, 1, 2 and 3 each have an outbound pin and an inbound pin.

Figure 4:
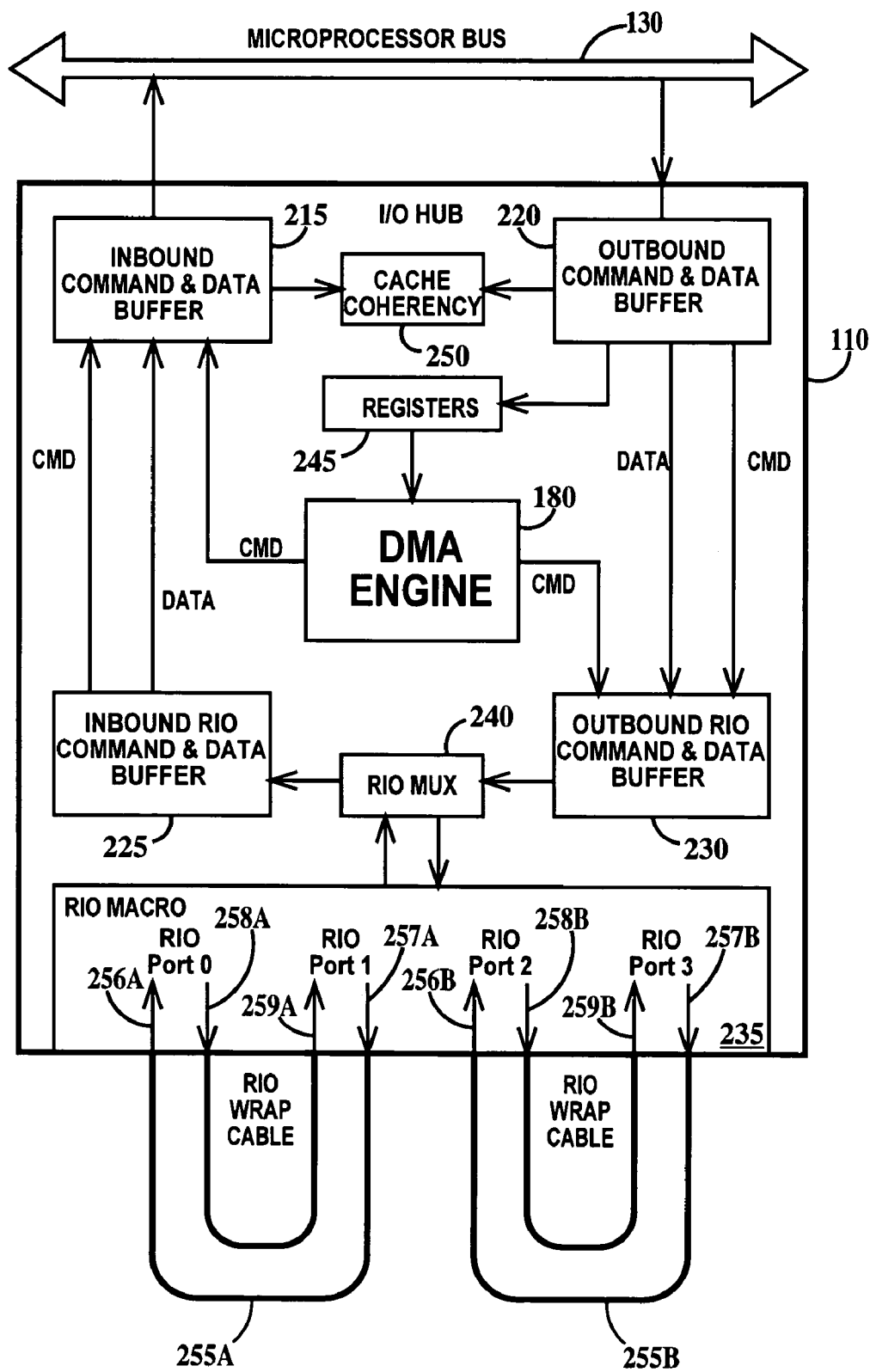
FIG. 4 is a schematic diagram of the I/O hub of the remote I/O sub-assembly of FIG. 1.

FIG. 4 is a schematic diagram of the I/O hub of the remote I/O sub-assembly of FIG. 1. In FIG. 4, I/O hub 110 includes DMA engine 180, an inbound command and data buffer 215, an outbound command and data buffer 220, an inbound RIO command and data buffer 225, an outbound RIO command and data buffer 230, a RIO macro 235 (which drives RIO ports 0, 1, 2 and 3), a RIO multiplexer 240, registers 245 and a cache coherency unit 250. Registers 245 is used to program DMA engine 180 with data transfer commands.

Inbound and outbound command and data buffers 215 and 220 are coupled to local microprocessor bus 130. Outbound command and data buffer 220 passes commands to outbound RIO command and data buffer 230, data transfer commands to registers 245 and data to outbound RIO command and data buffer 230. Outbound RIO command and data buffer 230 passes commands and data to RIO multiplexer 240. RIO multiplexer 240 passes and receives commands and data to and from appropriate RIO data ports 0, 1, 2 or 3 and also to inbound RIO command and data buffer 225. Inbound RIO command and data buffer 225 passes commands to inbound RIO command and data buffer 215. In bound command and data buffer 215 passes commands and data to local microprocessor bus 130. Registers 245 pass data to DMA engine 180 and the DMA engine passes data to outbound RIO command and data buffer 230 and to inbound command and data buffer 215.

In order to test CEC 100 (see FIG. 1) using the method of the present invention, RIO ports needs to be wrapped in pairs. A RIO wrap cable 255A is connected between RIO ports 0 and 1 and a RIO wrap cable 255B is connected between RIO ports 2 and 3 as shown in FIG. 4. RIO wrap cable 255A connects an inbound pin 256A of RIO port 0 to an outbound pin 257A of RIO port 1 and connects an outbound pin 258A of RIO port 0 to an inbound pin 259A of RIO port 1. RIO wrap cable 255B connects an inbound pin 256B of RIO port 2 to an outbound pin 257B of RIO port 3 and connects an outbound pin 258B of RIO port 2 to an inbound pin 259B of RIO port 3. The RIO wrap cables allow direct memory access (through DMA engine 180) from one location in system memory (memory devices 115 of FIG. 1) to another location in system memory by programming of the DMA engine as described infra. It should be noted that only RIO wrap cable 255A need be connected if RIO ports 2 and 3 are not to be tested and only RIO wrap cable 255B need be connected if RIO ports 0 and 1 are not to be tested, a single connected RIO port cable being sufficient to test all other functions of CEC 100 (see FIG. 1), though use of both RIO wrap cables increases the number of DMA paths DMA engine 180 can use. RIO wrap cables 255A and 255B may be actual cables or may be plugs with selected pairs of pins shorted that can engage RIO I/O sockets.

It should be understood that pins 256A, 256B, 257A, 257B, 258A, 258B, 259A and 259B illustrated in FIG. 4, may each represent the same number of multiple pins and RIO wrap cables 255A and 255B would include sufficient wires to directly connect all the corresponding inbound and outbound pins according to the protocol described supra.

DMA engines us a queue of descriptors to determine the source and destination location for the DMA data transfer. Each descriptor include a source memory location, a destination memory location, data size and one or more flags. The DMA engine will run until all data in the source memory location has been transferred to the destination memory location. The DMA engine will then stop unless the last descriptor is linked to the first descriptor in the queue.

The DMA engine allows chaining or linking of the descriptors which causes DMA transfers to happen one after another. When the last descriptor is linked back to the first descriptor the DMA transfers will happen until stopped by external intervention.

Linking the last descriptor to the first descriptor pumps high volumes of simulated data traffic continuously on the RIO buses and saturates the DMA transfer logic, the inbound and outbound command and data buffers, the inbound and outbound RIO command and data buffers and other support logic within the I/O hub. This also generates a high volume of data loads and store commands and data transfers on the local microprocessor bus thus saturating the local microprocessor bus.

Additional snoops, generated by accessing memory map I/O (MMIO) regions within the I/O hub, while the data memory access is happening, results in MMIO load and store commands and data transfers on the local microprocessor bus. MMIOs are hardware register to process software based address space. The high volume of direct memory access data load and stores along with the high volume of MMIO loads and stores puts the required stress on the CPU, memory controller and cache logic to further test remote I/O sub-assembly.

Figure 5:
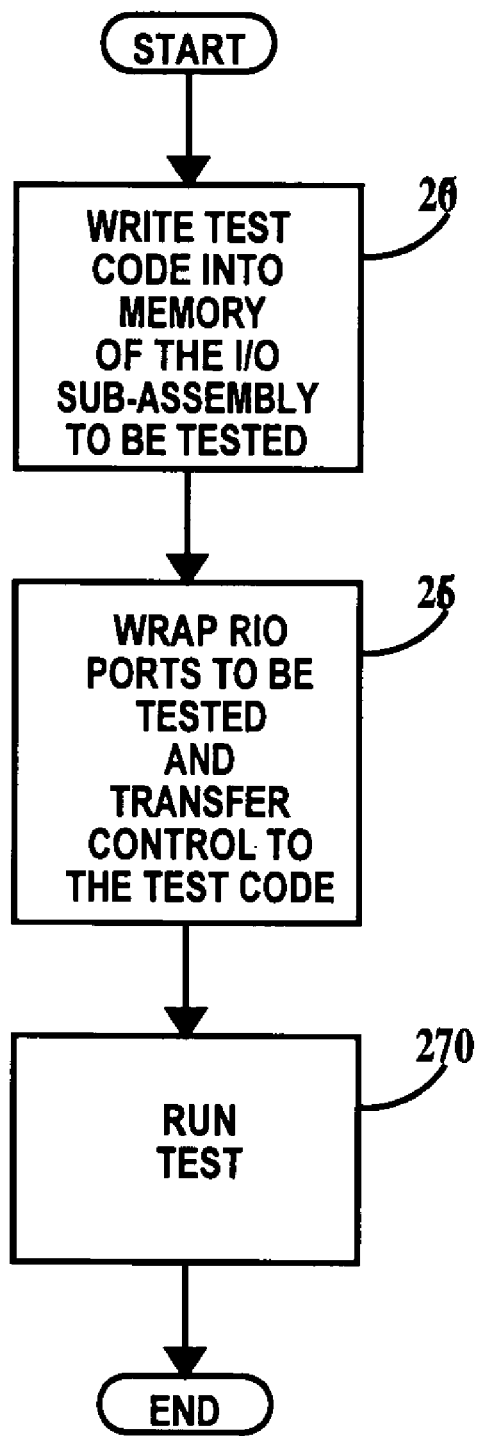
FIG. 5 is a flowchart of a method of testing the remote I/O sub-assembly of FIG. 1, according to the present invention.

FIG. 5 is a flowchart of a method of testing the remote I/O sub-assembly of FIG. 1, according to the present invention. In step 260, test code is written into the memory of the remote I/O sub-assembly to be tested. The test code defines the test data to transferred and the DMA descriptors for moving units of the test data from a source memory location to a destination memory location. In step 265, the RIO ports to be tested are wrapped (i.e. RIO wrap cables are connected as described supra) and control of the test is transferred to the test code resident in the memory of the remote I/O sub-assembly to be tested. In step 270, the test is allowed to proceed as illustrated in FIG. 6 and described infra.

Figure 6:
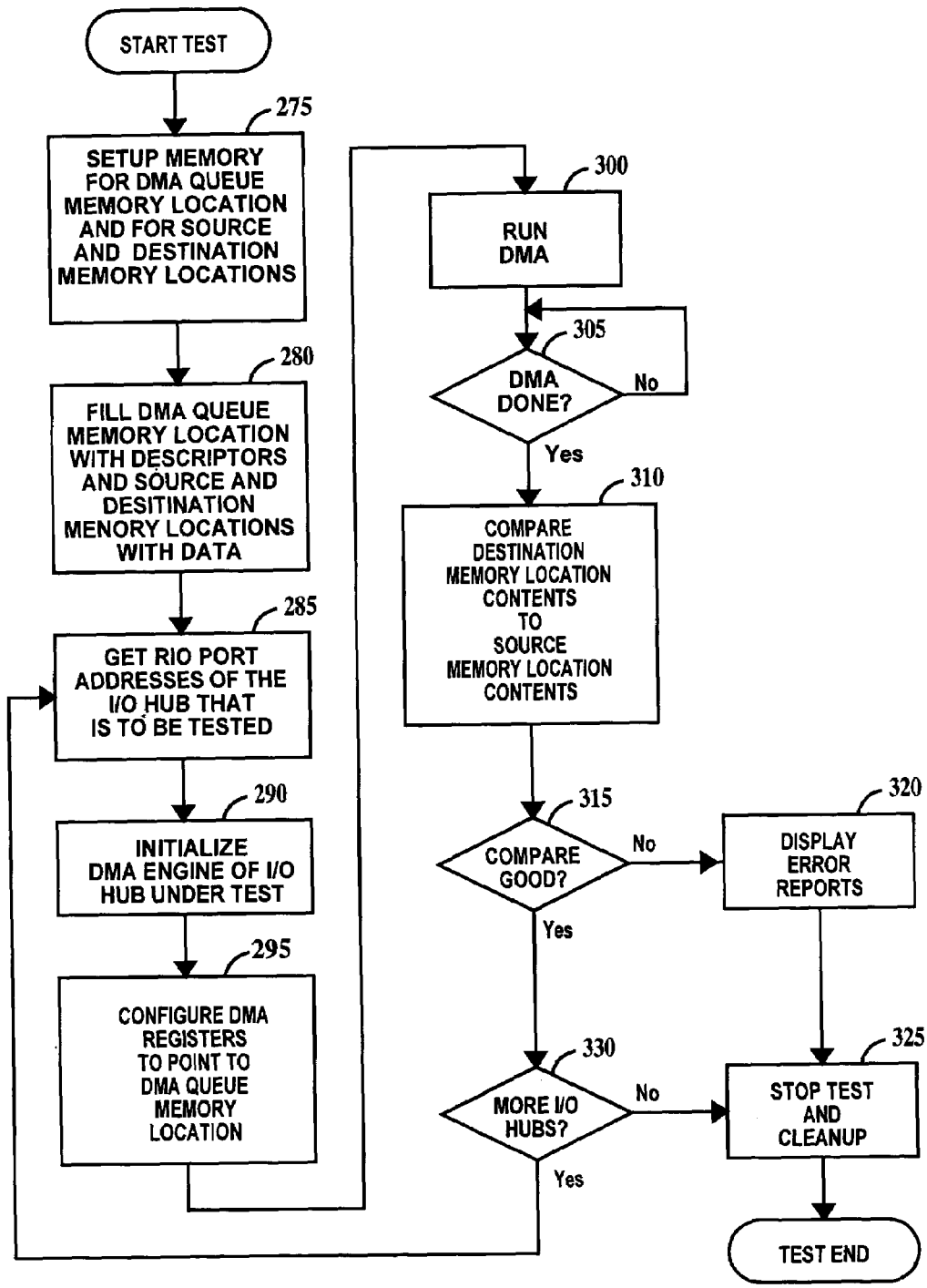
FIG. 6 is a detailed flowchart of step 270 of the flowchart of FIG. 5.

FIG. 6 is a detailed flowchart of step 270 of the flowchart of FIG. 5. In step 275, memory space is allocated for a DMA queue memory location, the source memory location and the destination memory location in the memory of the remote I/O sub-assembly under test based on the amount of data that will be transferred from the source memory location to the destination memory location.

In step 280, the source memory location is filled with a first known digital data pattern and the destination memory location is optionally filled with a second known digital data pattern different from the first known digital data pattern and the DMA queue is filled with DMA descriptors from the test code. Filling the destination memory location with the second known pattern may be useful in diagnosing certain types of fails.

In step 285, the RIO port addresses of the first/next I/O hub to be tested is obtained.

In step 290, the DMA engine of the I/O hub to be tested is initialized with the RIO port addresses obtained in step 285 and in step 295 registers in the DMA engine of the I/O hub to be tested are configured to point to the DMA queue memory location.

In step 300, the DMA engine is started. The DMA engine takes the first/next descriptor from the DMA queue and transfers data as specified by the DMA descriptor from the source memory location to the destination memory location. The source data is not removed, but the destination data is overwritten. This activity continues until the last descriptor is loaded into the DMA engine after which the DMA engine stops and the method moves to step 310 gated by step 305. Step 305 is a continuous poll of a DMA status register to monitor the end of DMA data transfers in step 300. Alternatively, in the example of the last descriptor being linked to the first descriptor, the data queue may be cycled through for a set number of cycles or for a set amount of time with step 305 keeping track and then stopped in step 305 when the number of cycles or the time limit is met and the method allowed to proceed to step 310.

In step 310, the contents of the destination memory location is compared to the contents of the source memory location. In step 315, if the data is not the same in the source memory location and in the destination memory location then error an error report is displayed in step 320 comparing the actual data in the destination memory location to the source data that was expected to be in the destination memory location and the DMA descriptor that generated the data mismatch. Then in step 325 further testing is halted and the source, destination and DMA queue memory locations cleared and the test terminated.

If in step 310, the contents of the destination memory location match the contents of the source memory location the method proceeds from step 315 to step 330. In step 330, it is determined if more I/O hubs remain to be tested. If not, then the method proceeds to step 325, otherwise the method loops back to step 285.

An example of a pseudo-test code is:

```
function main( )
{
    Get the data size that needs to be DMA'ed, store it as dmaSize.
    call AllocMem( )
    call Setup_DMA( )
    do
    {
        Get the RIO port details of the I/O hub to be tested.
        call DMAInit( )
        call KickOffDma( )
        call WaitForDmaCompletion( )
        result = Checker( )
        if( result is zero ) then
        {
            Display Error log data.
            break;
        }
    }while( more I/O hubs to be tested )
    call Cleanup( )
    exit.
}
function AllocMem( )
```

-continued

```
{
    Allocate memory for DMA QUEUE, based on the dmaSize, page
    align it.
    Allocate memory for Source &Destination Memory locations,
    based on the dmaSize, page align it.
    Get the real( physical) addresses of the each of these memory
    locations and store them.
    In case of any error, exit program, else return success.
}
function Setup_DMA( )
{
    Find number of descriptors, based on dmaSize, store it as nDesc.
    while( nDesc is not zero )
    {
        Create DMA descriptor.
        Update Source &Destination Memory real addresses.
        Update size of data to be DMA'ed in one descriptor.
            if( not last descriptor ) then
        {
            Update flags to chain this descriptor with the previous one.
        } else {
            Update flags to notify the end of descriptor chain.
        }
        Add/Append the descriptor in the DMA Queue.
        decrement nDesc by 1.
    }
}
function DMAInit( )
{
    Initialise the DMA Queue &other control registers of the DMA
    Engine of the I/O hub under test.
{
function KickOffDma( )
{
    Update the DMA Queue and other control registers of the DMA
    Engine with real address of the DMA Queue present in memory.
    Kick off the DMA, by updating the appropriate register of the
    DMA Engine.
}
function WaitForDmaCompletion( )
{
    Read the DMA status.
    while( DMA not completed )
    {
        Read the DMA status.
        if( DMA completed ) then
        {
        break
        }
    }
}
function Checker( )
{
    Compare the Source &Destination Memory locations.
    if( comparison is success ) then
    {
        return 1
    } else
    {
        return 0
    }
}
function Cleanup( )
{
    Free DMA QUEUE, Source &Destination Memory locations.
}
```

Figure 7:
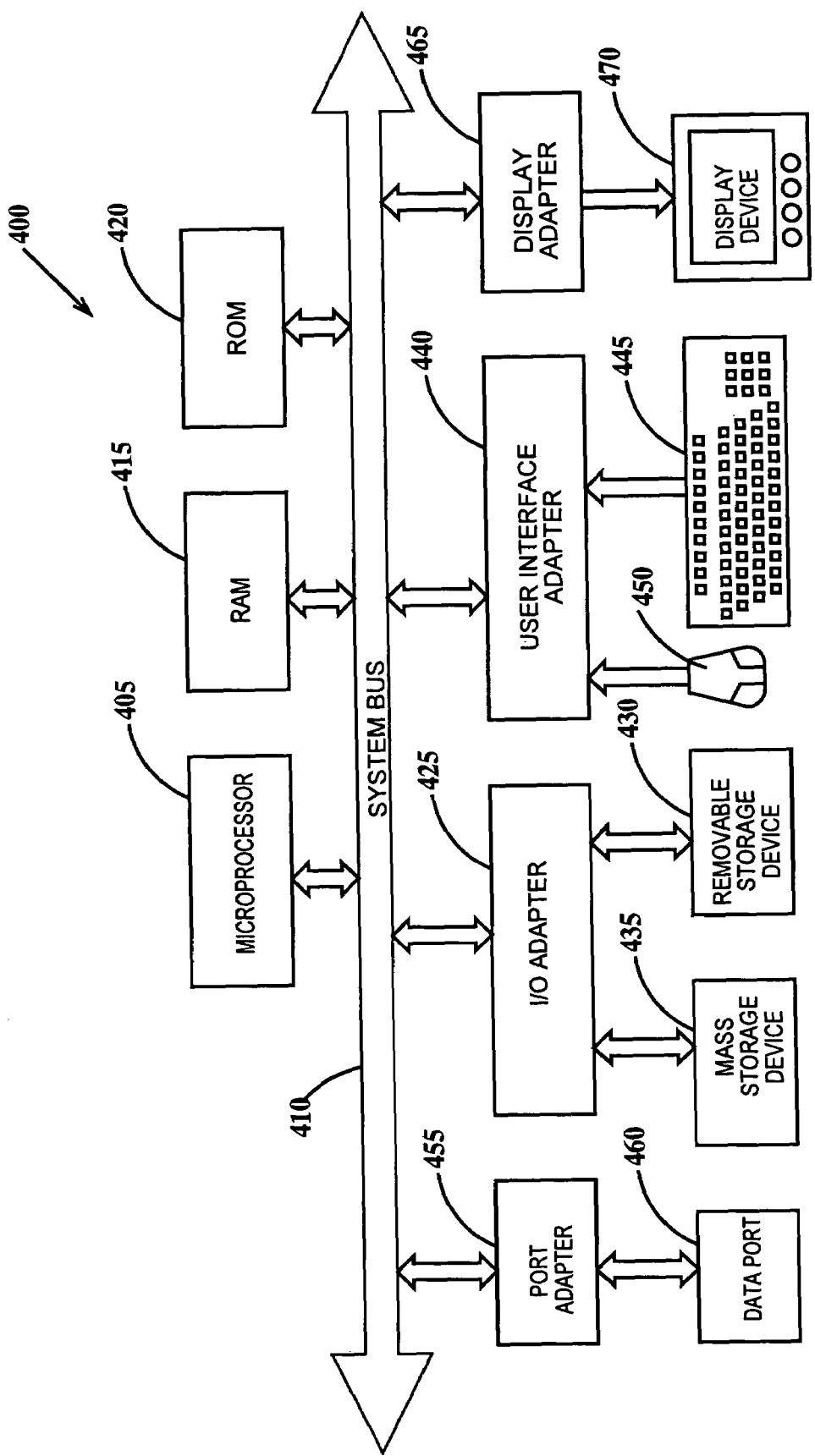
FIG. 7 is a schematic block diagram of a general-purpose computer for practicing the present invention.

Generally, the method described herein with respect to testing remote I/O sub-assemblies of a micro-processor based servers is practiced using a general-purpose computer, for writing descriptors to the DMA queue memory location and data to the source memory location and the destination memory location for initializing the DMA engine and for clearing the memory locations after the test is complete. The general-purpose computer is also used to read out data from the destination memory location and display the comparison between the source data and the destination data after the test is complete. The method may be coded as a set of instructions on removable or hard media for use by the general-purpose computer. FIG. 7 is a schematic block diagram of a general-purpose computer for practicing the present invention. In FIG. 7, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface to the remote I/O sub-assembly may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

Thus, the present invention provides an inexpensive and efficient method and system for testing remote I/O sub-assemblies of a micro-processor based servers and eliminates the need for physical I/O systems for testing remote I/O sub-assemblies.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method of testing a remote I/O sub-assembly, comprising:

(a) allocating a source memory location, a destination memory location and a direct memory access queue memory location in a memory device of said remote I/O sub-assembly, said remote I/O sub-assembly including a micro-processor coupled to said memory device and to an I/O hub, said I/O hub including a direct memory access engine coupled to a pair of first and second remote I/O ports, a first remote I/O port of said pair of remote I/O ports having an inbound pin and an outbound pin, and a second remote I/O port of said pair of I/O ports having an inbound pin and an outbound pin;

(b) writing test data into said source memory location;

(c) writing a set of descriptors simulating data transfer commands that transfer data between said source and destination memory locations into said direct memory access queue memory location;

(d) directly connecting said inbound pin of said first remote I/O port of said I/O hub to said outbound pin of said second remote I/O port of said I/O hub and directly connecting said inbound pin of said second remote I/O port of said remote I/O hub sub-assembly to said outbound pin of said first remote I/O port of said remote I/O hub sub-assembly;

(e) configuring said direct memory access engine of said remote I/O sub-assembly to point to said direct memory access queue memory location and to said first and second remote I/O ports;

(f) loading each descriptor of said set of descriptors into said direct memory access engine and transferring said test data from said source memory location to said destination memory location based on said descriptors; and (g) comparing said test data in said source memory location to resultant data in said destination memory location after said transferring of said test data.

2. The method of claim 1, wherein step (b) further includes writing additional test data into said destination memory location, said additional test data different from said test data.

3. The method of claim 1, further including:

(h) generating an error report based on said comparing said test data in said source memory location to said resultant data in said destination memory location.

4. The method of claim 1 wherein said I/O hub further includes additional pairs of first and second remote I/O ports each I/O port of said additional pairs of first and second remote I/O ports having an inbound and an outbound pin, and further including:

repeating steps (d) through (g) for each additional pair of remote I/O ports of said remote I/O hub.

5. The method of claim 1, wherein said remote I/O sub-assembly further includes additional I/O hubs, each additional I/O hub including a direct memory access engine and a pair of first and second remote I/O ports, a first remote I/O port of said pair of remote I/O ports having an inbound pin and an outbound pin, and a second remote I/O port of said pair of I/O ports having an inbound pin and an outbound pin; and further including:

repeating steps (d) through (g) for each additional I/O hub of said remote I/O sub-assembly.

6. The method of claim 5 further including repeating steps (d) through (g) each additional each additional pair of remote I/O ports of each additional I/O hub of said remote I/O sub-assembly.

7. A computer system comprising a processor, an address/data bus coupled to said processor, and a computer-readable memory unit coupled to said processor, said memory unit containing instructions that when executed by said processor implement a method for testing a remote I/O sub-assembly, said remote I/O sub-assembly including a micro-processor coupled to said memory device and to an I/O hub, said I/O hub including a direct memory access engine coupled to a pair of first and second remote I/O ports, a first remote I/O port of said pair of remote I/O ports having an inbound pin and an outbound pin, and a second remote I/O port of said pair of I/O ports having an inbound pin and an outbound pin, said inbound pin of said first remote port directly connected to said outbound pin of said second remote port and said inbound pin of said second remote port directly connected to said outbound pin of said first remote I/O port, said method comprising the computer implemented steps of:

(a) allocating a source memory location, a destination memory location and a direct memory access queue memory location in said memory device of said remote I/O sub-assembly;

(b) writing test data into said source memory location;

(c) writing a set of descriptors simulating data transfer commands that transfer data between said source and destination memory locations into said direct memory access queue memory location;

(d) configuring said direct memory access engine of said remote I/O sub-assembly to point to said direct memory access queue memory location and to said first and second remote I/O ports of said remote I/O sub-assembly;

(e) initiating loading of said set of descriptors into said direct memory access engine and initiating transferring of said test data from said source memory location to said destination memory location based on said descriptors; and (f) comparing said test data in said source memory location to resultant data in said destination memory location after said transferring of said test data.

8. The computer system of claim 7, wherein the method step (b) further includes writing additional test data into said destination memory location, said additional test data different from said test data.

9. The computer system of claim 7, the method further including:

(g) generating an error report based on said comparing said test data in said source memory location to said resultant data in said destination memory location.

10. The computer system of claim 7, wherein said I/O hub further includes additional pairs of first and second remote I/O ports each I/O port of said additional pairs of first and second remote I/O ports having an inbound and an outbound pin, and the method further including:

repeating steps (d) through (f) for each additional pair of remote I/O ports of said remote I/O hub.

11. The computer system of claim 7, said remote I/O sub-assembly further includes additional I/O hubs, each additional I/O hub including a direct memory access engine and a pair of first and second remote I/O ports, a first remote I/O port of said pair of remote I/O ports having an inbound pin and an outbound pin, and a second remote I/O port of said pair of I/O ports having an inbound pin and an outbound pin; and said method further including:

repeating steps (d) through (f) for each additional I/O hub of said remote I/O sub-assembly.

12. The computer system of claim 11, further including repeating steps (d) through (f) each additional each additional pair of remote I/O ports of each additional I/O hub of said remote I/O sub-assembly.

13. A computer program product, comprising a computer usable medium having a computer readable program code embodied therein, said computer readable program code comprising an algorithm adapted to implement a method for a method for testing a remote I/O sub-assembly, said remote I/O sub-assembly including a micro-processor coupled to said memory device and to an I/O hub, said I/O hub including a direct memory access engine coupled to a pair of first and second remote I/O ports, a first remote I/O port of said pair of remote I/O ports having an inbound pin and an outbound pin, and a second remote I/O port of said pair of I/O ports having an inbound pin and an outbound pin, said inbound pin of said first remote port directly connected to said outbound pin of said second remote port and said inbound pin of said second remote port directly connected to said outbound pin of said first remote I/O port, said method comprising the steps of:

(a) allocating a source memory location, a destination memory location and a direct memory access queue memory location in said memory device of said remote I/O sub-assembly;
(b) writing test data into said source memory location;
(c) writing a set of descriptors simulating data transfer commands that transfer data between said source and destination memory locations into said direct memory access queue memory location;
(d) configuring said direct memory access engine of said remote I/O sub-assembly to point to said direct memory access queue memory location and to said first and second remote I/O ports of said remoter I/O sub-assembly;
(e) initiating loading said set of descriptors into said direct memory access engine and initiating transferring of said test data from said source memory location to said destination memory location based on said descriptors; and
(f) comparing said test data in said source memory location to resultant data in said destination memory location after said transferring of said test data.

14. The computer program product of claim 13, wherein the method step (b) further includes writing additional test data into said destination memory location, said additional test data different from said test data.

15. The computer program product of claim 13, the method further including:
(g) generating an error report based on said comparing said test data in said source memory location to said resultant data in said destination memory location.

16. The computer program product of claim 13, wherein said I/O hub further includes additional pairs of first and second remote I/O ports each I/O port of said additional pairs of first and second remote I/O ports having an inbound and an outbound pin, and the method further including:
repeating steps (d) through (f) for each additional pair of remote I/O ports of said remote I/O hub.

17. The computer program product of claim 13, further including repeating steps (d) through (f) each additional each additional pair of remote I/O ports of each additional I/O hub of said remote I/O sub-assembly.

18. The method of claim 1, wherein (d) includes connecting a first end of a remote I/O wrap cable to said first remote I/O port and a second and opposite end of said remote wire wrap cable to said second remote I/O port.

19. The method of claim 1, wherein (d) includes inserting a plug having corresponding pairs of pins shorted together into a socket providing connections to said inbound and outbound pins of said first and second remote I/O ports, said shorting said inbound pin of said first remote I/O port of said remote I/O hub sub-assembly to said outbound pin of said second remote I/O port of said remote I/O hub sub-assembly.

20. The method of claim 1, wherein (f) includes said dynamic memory access engine loading descriptors from said memory access queue memory location and transferring data stored in said source memory locations to said destination memory locations based on the contents of descriptors.

21. The method of claim 20, wherein each descriptor of said set of descriptors includes a source memory location, a destination memory location.

22. The computer system of claim 7, wherein each descriptor of said set of descriptors includes a source memory location, a destination memory location.

23. The computer program product of claim 13, wherein said remote I/O sub-assembly further includes additional I/O hubs, each additional I/O hub including a direct memory access engine and a pair of first and second remote I/O ports, a first remote I/O port of said pair of remote I/O ports having an inbound pin and an outbound pin, and a second remote I/O port of said pair of I/O ports having an inbound pin and an outbound pin; and said method further including:
repeating steps (d) through (f) for each additional I/O hub of said remote I/O sub-assembly.

24. The computer program product of claim 13, wherein each descriptor of said set of descriptors includes a source memory location, a destination memory location.

* * * * *